United States Patent
Takahashi et al.

(10) Patent No.: US 7,272,185 B2
(45) Date of Patent: Sep. 18, 2007

(54) MOVING PICTURE ENCODING APPARATUS

(75) Inventors: Masaru Takahashi, Yokohama (JP); Taku Nakamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 91 days.

(21) Appl. No.: 11/190,272

(22) Filed: Jul. 26, 2005

(65) Prior Publication Data

US 2005/0254582 A1   Nov. 17, 2005

Related U.S. Application Data

(62) Division of application No. 10/279,370, filed on Oct. 23, 2002, now Pat. No. 6,940,906.

(30) Foreign Application Priority Data

Jun. 17, 2002   (JP) .............................. 2002-175720

(51) Int. Cl.
*H04B 1/66* (2006.01)

(52) U.S. Cl. .......................... 375/240.16; 375/240.12; 375/240.24; 375/240.25; 375/240.14; 382/238; 382/236; 382/233; 382/235; 382/246

(58) Field of Classification Search ............ 375/240.16, 375/240.12, 240.25, 240.24, 240.26, 240.14; 382/233, 238, 246, 236, 235

See application file for complete search history.

(56) References Cited

U.S. PATENT DOCUMENTS

| | | | | |
|---|---|---|---|---|
| 5,831,688 A | * | 11/1998 | Yamada et al. | 348/699 |
| 5,940,130 A | * | 8/1999 | Nilsson et al. | 375/240.12 |
| 7,058,127 B2 | * | 6/2006 | Lu et al. | 375/240.06 |

\* cited by examiner

*Primary Examiner*—Shawn S. An
(74) *Attorney, Agent, or Firm*—Townsend and Townsend and Crew LLP

(57) ABSTRACT

Data of both MPEG-2 and MPEG-4 is generated simultaneously with a small circuit scale and a small power consumption. A moving picture encoding apparatus for encoding a moving picture through motion-compensated interframe prediction has: a MPEG-2 encoding unit including a motion vector estimator, a frame memory, a forward prediction circuit, a bidirectional prediction circuit, a prediction selection circuit, an intra-frame encoding circuit and a local decoding circuit; a MPEG-4 encoding unit including a frame extraction circuit for extracting a predetermined MPEG-2 frame and a transcoder for encoding the extracted frame; a motion vector calculator calculating a motion vector to be used for MPEG-4 prediction from a motion vector to be used for MPEG-2 prediction; and a prediction mode controller controlling the prediction mode of the MPEG-2 encoding unit in such that the MPEG-2 prediction mode becomes coincident with the MPEG-4 prediction mode.

2 Claims, 13 Drawing Sheets

FIG.5
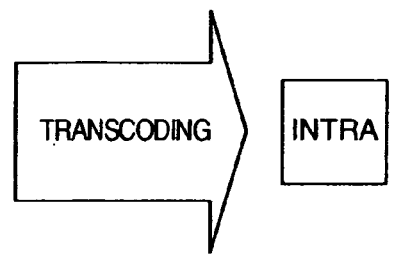
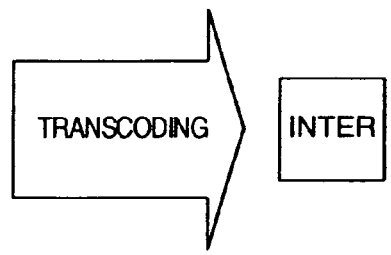
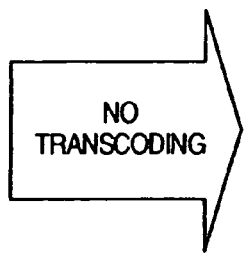

FIG.7
IMMEDIATELY AFTER
IMAGE QUALITY
DETERIORATION
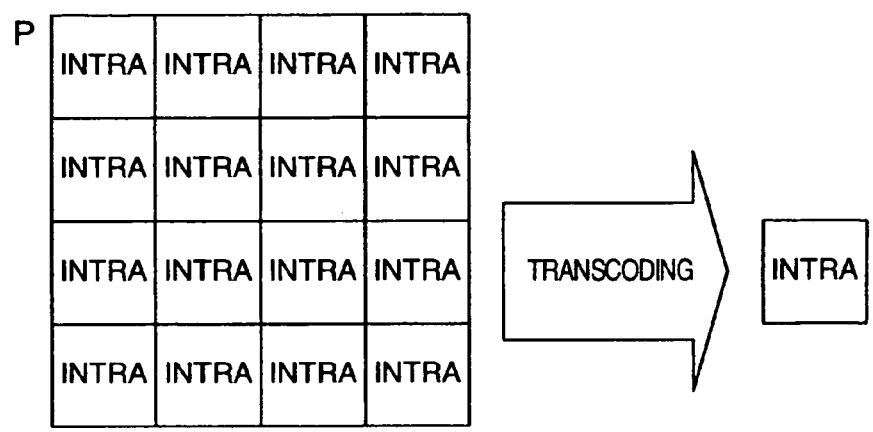
OTHER CASES
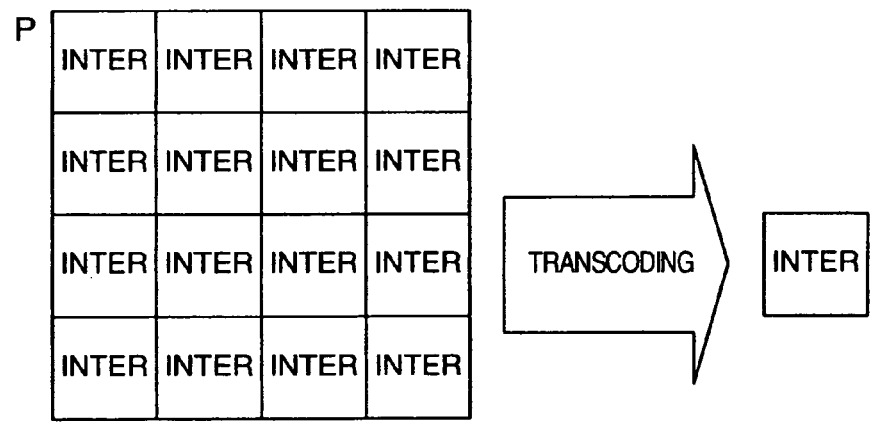

FIG.9

VECTOR

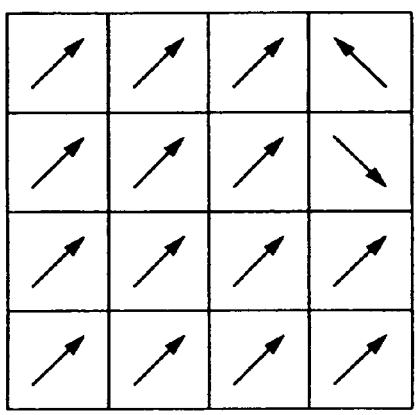

VECTOR SELECTION

DIFFERENCE VALUE

| DIFFER-ENCE | DIFFER-ENCE | DIFFER-ENCE | DIFFER-ENCE |
|---|---|---|---|
| DIFFER-ENCE | DIFFER-ENCE | DIFFER-ENCE | DIFFER-ENCE |
| DIFFER-ENCE | DIFFER-ENCE | DIFFER-ENCE | DIFFER-ENCE |
| DIFFER-ENCE | DIFFER-ENCE | DIFFER-ENCE | DIFFER-ENCE |

INVALIDATE

| DIFFER-ENCE | DIFFER-ENCE | DIFFER-ENCE | 0 |
|---|---|---|---|
| DIFFER-ENCE | DIFFER-ENCE | DIFFER-ENCE | 0 |
| DIFFER-ENCE | DIFFER-ENCE | DIFFER-ENCE | DIFFER-ENCE |
| DIFFER-ENCE | DIFFER-ENCE | DIFFER-ENCE | DIFFER-ENCE |

MOVING PICTURE ENCODING APPARATUS

CROSS-REFERENCE TO RELATED APPLICATIONS

The present application is a divisional application and claims priority to U.S. application Ser. No. 10/279,370, filed on Oct. 23, 2002, U.S. Pat. No. 6,940,906 and claims priority to Japanese Patent Application No. 2002-175720, filed Jun. 17, 2002, which are both incorporated by reference.

BACKGROUND OF THE INVENTION

The present invention relates to a moving picture encoding apparatus for encoding a moving picture by utilizing motion-compensated inter-frame prediction and to a moving picture recording/reproducing apparatus for recording and reproducing encoded data.

Technique of converting data encoded by MPEG-2 into encoded data of MPEG-4 and the like having a different frame rate and a different image size is introduced into IEEE TRANSACTIONS ON MULTIMEDIA, Vol. 2, No. 2, JUNE 2000, pp. 101 to 110.

BRIEF SUMMARY OF THE INVENTION

This conventional technique adopts a method of decoding data by MPEG-2 and then encoding it by MPEG-4, and is associated with some problems of a large circuit scale or a large consumption power because of a large computation amount.

Although the conventional technique discloses the conversion into encoded data having a different frame rate and a different image size, it does not teach the capability of converting data with a small circuit scale or a small consumption power by reducing the computation amount. It neither teaches the simultaneous generation of encoded data having a different frame rate and a different image size.

It is an object of the invention to provide a moving picture encoding apparatus and a moving picture recording/reproducing apparatus capable of converting or generating at the same time encoded data having a different frame rate and a different picture size with a small computation amount, i.e., with a small circuit scale or a small consumption power.

In order to achieve the above object, a moving picture encoding apparatus for encoding a moving picture by utilizing motion-compensated inter-frame prediction, comprises: a first encoding module for encoding the moving picture at a first frame rate and at a first image size; a second encoding module for encoding the moving picture at a second frame rate and at a second image size; a prediction mode control module for controlling to make a prediction mode of the first encoding module be coincident with a prediction mode of the second encoding module; and a motion vector calculation module for calculating a motion vector to be used by the second encoding module from a motion vector to be used by the first encoding module.

BRIEF DESCRIPTION OF THE DRAWINGS

These and other features, objects and advantages of the present invention will become more apparent from the following description when taken in conjunction with the accompanying drawings wherein:

FIG. 5 is a diagram illustrating an example of the state of intra/inter of a macro block before and after transcoding according to the embodiment shown in FIG. 4.

FIG. 7 is a diagram illustrating an example of the state of intra/inter of a macro block before and after transcoding of the embodiment shown in FIG. 6.

FIG. 9 is a diagram showing the state of motion vector conversion and difference value replacement.

DETAILED DESCRIPTION OF THE INVENTION

Figure 1:
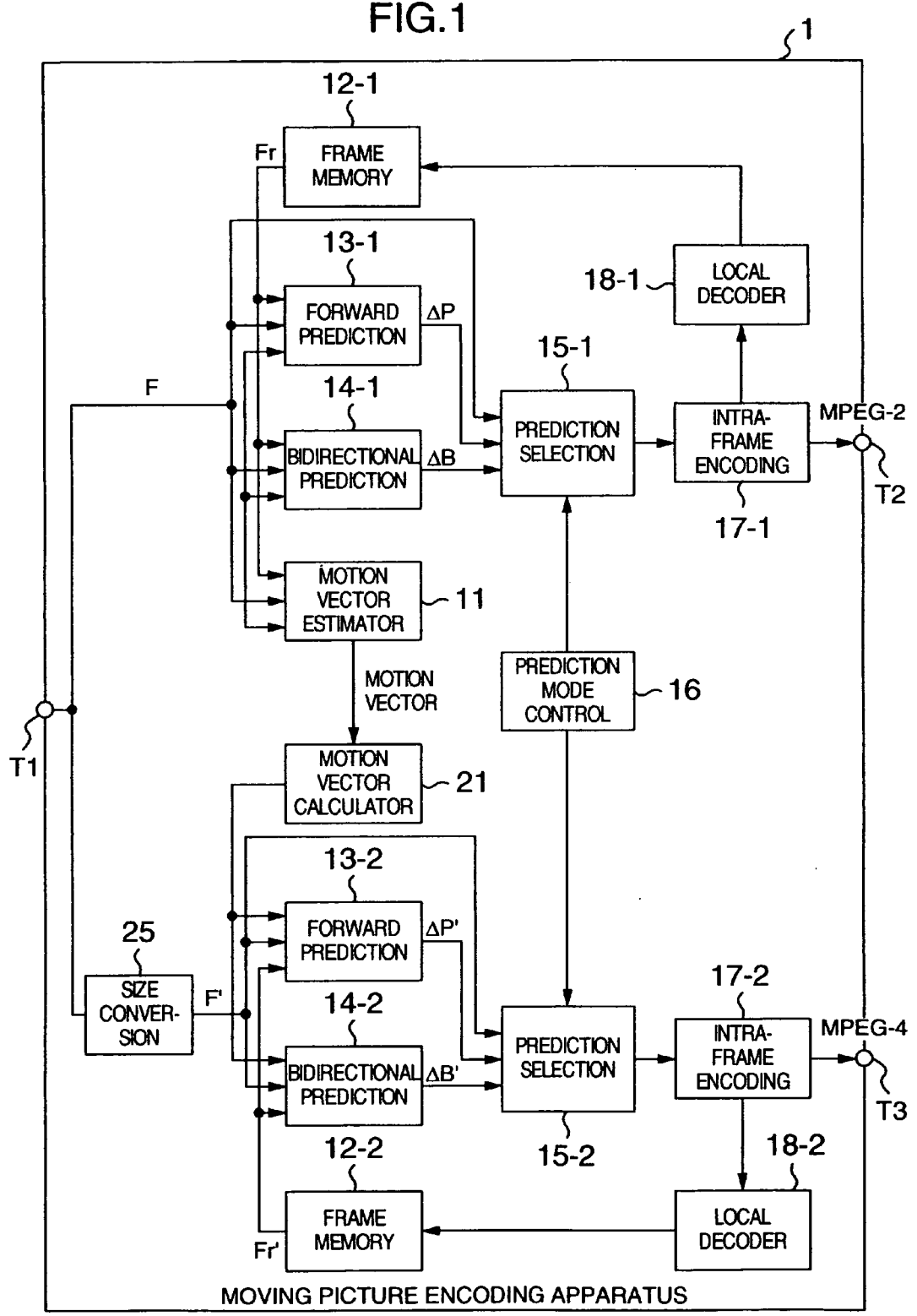
FIG. 1 is a block diagram showing a moving picture encoding apparatus according to a first embodiment of the invention.
Figure 2:
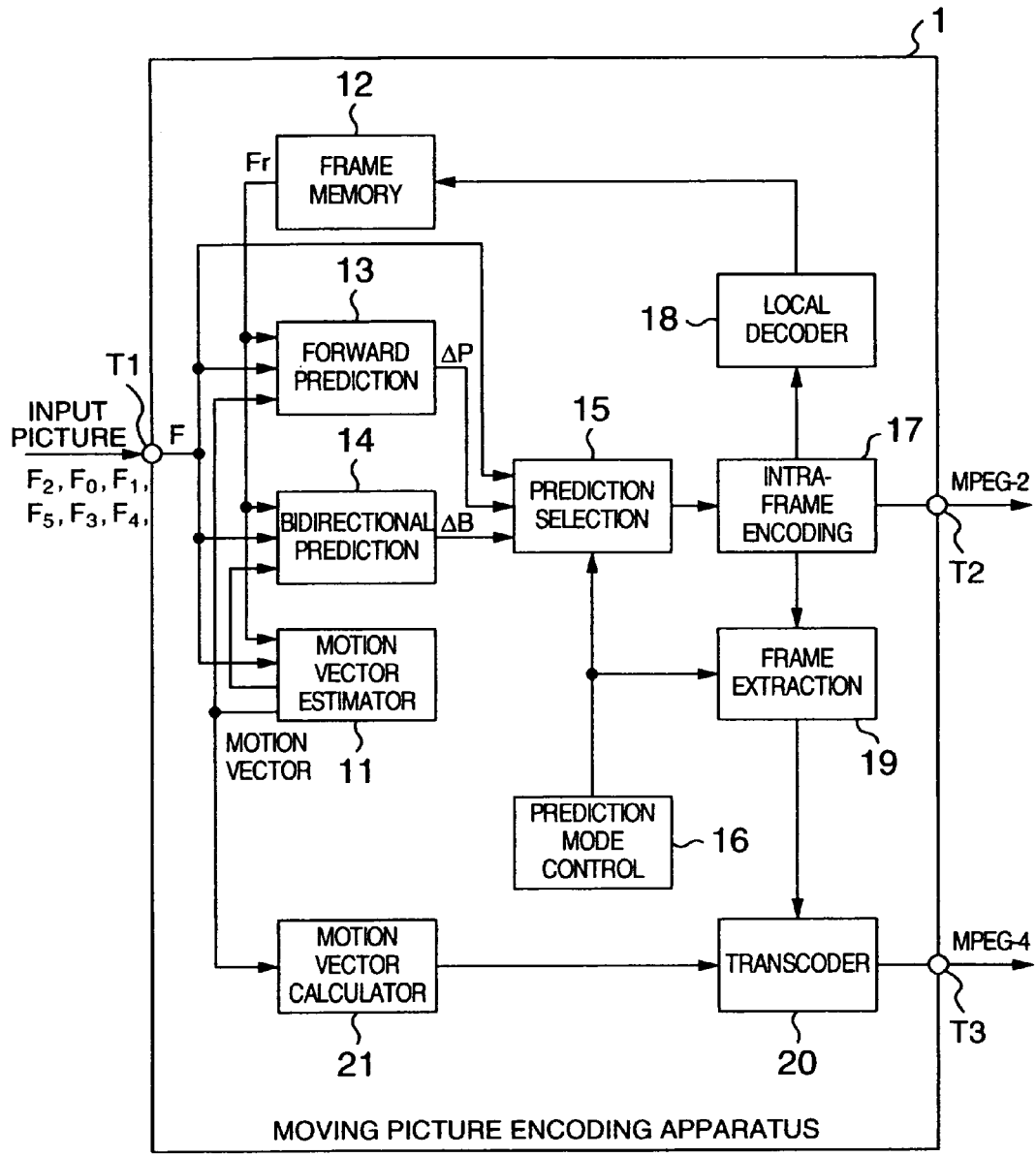
FIG. 2 is a block diagram showing a moving picture encoding apparatus with an improved shared structure of MPEG-2 and MPEG-4 used by the embodiment shown in FIG. 1.
Figure 3:
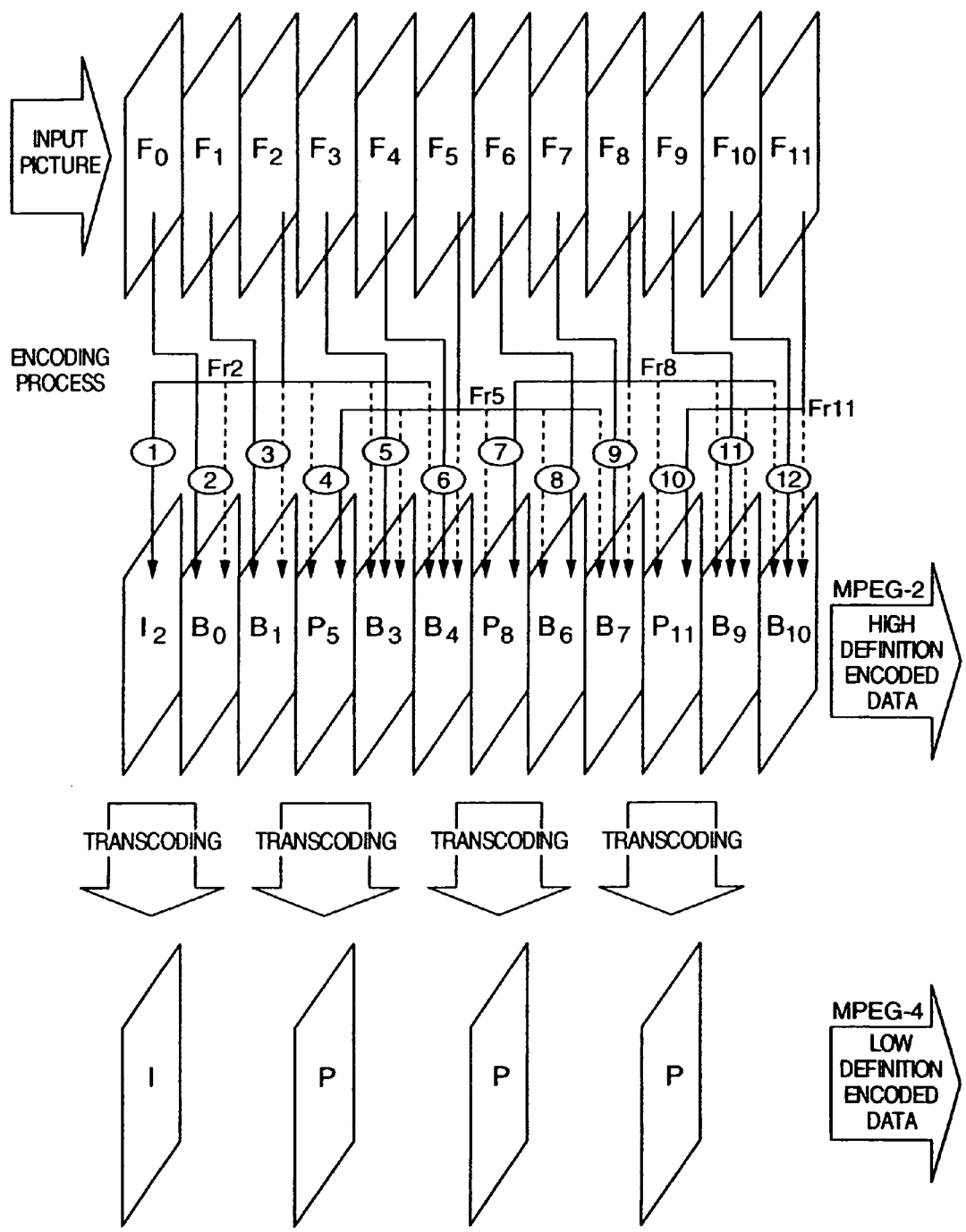
FIG. 3 is a conceptual diagram showing encoded data having a different frame rate and a different image size generated at the same time by a moving picture encoding apparatus according to the invention.

Embodiments of a moving picture encoding apparatus according to the invention will be described with reference to the accompanying drawings. FIG. 1 is a block diagram showing the outline structure of a moving picture encoding apparatus according to the invention. FIG. 2 is a block diagram showing the outline structure of a moving picture encoding apparatus with an improved shared structure of MPEG-2 and MPEG-4 used in the apparatus shown in FIG. 1. FIG. 3 is a conceptual diagram illustrating encoded data having a different frame rate and a different image size generated at the same time by a moving picture encoding apparatus of the invention.

The structure of the moving picture encoding apparatus shown in FIG. 1 will be described. The moving picture encoding apparatus is constituted of: a first encoding module (MPEG-2) having a motion vector estimator 11, a frame memory 12-1, a forward predication circuit 13-1, a bidirectional prediction circuit 14-1, a prediction selection circuit 15-1, a prediction mode control circuit 16, an intra-frame encoder circuit 17-1 and a local decoder circuit 18-1; a second encoding module (MPEG-4) having a motion vector calculator 21, a frame memory 12-2, a forward predication circuit 13-2, a bidirectional prediction circuit 14-2, a prediction selection circuit 15-2, a prediction mode control circuit 16, an intra-frame encoder circuit 17-2, a local decoder circuit 18-2 and a size conversion circuit 25; a moving picture input terminal T1: an output terminal T2 for high-definition encoded data (MPEG-2); and an output terminal T3 for low-definition encoded data (MPEG-4). The prediction mode control circuit 16 is used in common by the first and second encoding modules.

The motion vector estimator 11 obtains forward or bidirectional motion vector by performing block matching between moving picture data F input to the moving picture input terminal T1 and a past or future reference frame Fr stored in the frame memory 12-1.

The frame memory 12-1 stores a past or future reference frame Fr.

The forward prediction circuit 13-1 performs forward prediction through motion compensation between the input moving picture data F and the reference frame Fr in accordance with the motion vector to thereby generate difference data ΔP.

The bidirectional prediction circuit 14-1 performs bidirectional prediction through motion compensation between the input moving picture data F and the reference frame Fr in accordance with the motion vector obtained by the motion vector estimator 11 to thereby generate difference data ΔB.

The prediction selection circuit 15-1 selects one of the input moving picture data F itself, forward predicted difference data ΔP and bidirectionally predicted difference data ΔB in accordance with an instruction from the bidirectional mode control circuit 16.

The prediction mode control circuit 16 controls the prediction mode of the prediction selection circuit 15-1 in such a manner that the encoding prediction mode of the first encoding module becomes coincident with the encoding prediction mode of the second encoding module.

The intra-frame encoder circuit 17-1 encodes data selected by the prediction selection circuit 15-1 by a compression method utilizing intra-frame correlation such as DCT (Discrete Fourier Transform) to output high-definition encoded data (MPEG-2).

The local decoder circuit 18-1 decodes an I or P frame in the encoded data to generate a reference frame Fr to be used for next prediction.

The frame memory 12-2 stores a past or future reference frame Fr'.

The forward prediction circuit 13-2 performs forward prediction through motion compensation between the an output F' of the size conversion circuit 25 and the reference frame Fr' in accordance with a motion vector calculated by the vector calculator 21 to thereby generate difference data ΔP'.

The bidirectional prediction circuit 14-2 performs bidirectional prediction through motion compensation between the output F' of the size conversion circuit 25 and the reference frame Fr' in accordance with the motion vector calculated by the motion vector calculator 21 to thereby generate difference data ΔB'. The prediction selection circuit 15-2 selects one of the input moving picture data F' itself, forward predicted difference data ΔP' and bidirectionally predicted difference data ΔB' in accordance with an instruction from the prediction mode control circuit 16.

The prediction mode control circuit 16 controls the prediction mode of the prediction selection circuit 15-2 in such a manner that the encoding prediction mode of the first encoding module becomes coincident with the encoding prediction mode of the second encoding module.

The intra-frame encoder circuit 17-2 encodes data selected by the prediction selection circuit 15-2 by a compression method utilizing intra-frame correlation such as DCT to output low-definition encoded data (MPEG-4).

The local decoder circuit 18-2 decodes an I or P frame in the encoded data to generate a reference frame Fr' to be used for next prediction.

The motion vector calculator 21 calculates a motion vector to be used after conversion by the second encoding module, by using the motion vector for forward prediction obtained by the motion vector estimator 11.

The size conversion circuit 25 reduces the size of the moving picture data F input from the moving picture input terminal T1 so as to match MPEG-4.

The moving picture input terminal T1 receives the moving picture data F.

The high-definition encoded data output terminal T2 is used for outputting high-definition encoded data (MPEG-2) encoded by the intra-frame encoding circuit 17-1.

The low-definition encoded data output terminal T3 is used for outputting low-definition encoded data (MPEG-4) encoded by the intra-frame encoding circuit 17-2.

The first encoding module constitutes an encoder of MPEG-2, whereas the second encoding module constitutes an encoder of MPEG-4. The encoder of MPEG-4 is provided with the size conversion circuit. This embodiment is characterized in that both of the prediction modes are made coincident and that the motion vector of MPEG-4 is calculated from the motion vector estimated by MPEG-2.

By making coincident both the prediction modes of the first and second encoding modules, it is possible to allow the encoder of MPEG-4 to use the motion vector estimated by MPEG-2. It is not necessary for the encoder of MPEG-4 to estimate the motion vector. The computation amount can therefore be reduced considerably.

The structure and operation of a moving picture encoding apparatus shown in FIG. 2 will be described in which the apparatus shown in FIG. 2 shares the common circuits used in the first and second encoding modules of the moving picture encoding apparatus 1. The moving picture encoding apparatus 1 shown in FIG. 2 is constituted of a motion vector estimator 11, a frame memory 12, a forward prediction circuit 13, a bidirectional prediction circuit 14, a prediction selection circuit 15, a prediction mode control circuit 16, an intra-frame encoding circuit 17, a local decoder circuit 18, a frame extracting circuit 19, a transcoder circuit 20, a motion vector calculator 21, a moving picture input terminal T1, an output terminal T2 for high-definition encoded data (MPEG-2) and an output terminal T3 for low-definition encoded data (MPEG-4).

The motion vector estimator 11 obtains forward or bidirectional motion vector by performing block matching between moving picture data F input to the moving picture input terminal T1 and a past or future reference frame Fr stored in the frame memory 12.

The frame memory 12 stores a past or future reference frame Fr.

The forward prediction circuit 13 performs forward prediction through motion compensation between the input moving picture data F and the reference frame Fr in accordance with the motion vector to thereby generate difference data ΔP.

The bidirectional prediction circuit 14 performs bidirectional prediction through motion compensation between the input moving picture data F and the reference frame Fr in accordance with the motion vector obtained by the motion vector estimator 11 to thereby generate difference data ΔB.

The prediction selection circuit 15 selects one of the input moving picture data F itself, forward predicted difference data ΔP and bidirectionally predicted difference data ΔB in accordance with an instruction from the prediction mode control circuit 16. Namely, the prediction selection circuit 15 outputs picture data after motion compensation.

The prediction mode control circuit 16 controls the prediction mode of the prediction selection circuit 15 and the frame extraction circuit 19 in such a manner that the encoding prediction mode of the first encoding module becomes coincident with the encoding prediction mode of the second encoding module.

The intra-frame encoder circuit 17 encodes data selected by the prediction selection circuit 15 by a compression method utilizing intra-frame correlation such as DCT (Discrete Fourier Transform) to output high-definition encoded data (MPEG-2).

The local decoder circuit 18 decodes an I or P frame in the encoded data to generate a reference frame Fr to be used for next prediction.

In response to a control signal from the prediction mode control circuit 16, the frame extraction circuit 19 extracts image data or DCT coefficients of the I and P frame in high-definition data under encoding, as shown in the lower row in FIG. 3.

The transcoder circuit 20 converts encoded data of the I and P frames into encoded data having a small image size by using the motion vector calculated by the motion vector calculator 21. Namely, this circuit changes a resolution. In the transcoder circuit 20, image data after motion compensation is subjected to resolution conversion and thereafter encoded by a compression method utilizing inter-frame correlation such as DCT, or alternatively coefficient data after DCT is directly converted to coefficient data after resolution conversion to encode the data.

The motion vector calculator 21 calculates motion vector for transcoding at the transcoder circuit 20 by using the motion vector for forward prediction obtained by the motion vector estimator 11.

The moving picture input terminal T1 receives the moving picture data F.

The high-definition encoded data output terminal T2 is used for outputting high-definition encoded data (MPEG-2) encoded by the intra-frame encoding circuit 17.

The low-definition encoded data output terminal T3 is used for outputting low-definition encoded data (MPEG-4) transformed by the transcoder circuit 20.

The operation of the moving picture encoding apparatus 1 of the invention will be described. The motion vector estimator 11 obtains forward or bidirectional motion vector through block matching between moving picture data F input to the moving picture input terminal T1 and the past or future reference frame Fr stored in the frame memory 12, and sends it to the forward prediction circuit 13 or bidirectional prediction circuit 14.

The forward prediction circuit 13 performs forward prediction through motion compensation between the input moving picture data F and the reference frame Fr in accordance with the motion vector to generate the difference data ΔP. The bidirectional prediction circuit 14 performs bidirectional prediction through motion compensation between the input moving picture data F and the reference frame Fr in accordance with the motion vector to generate the difference data ΔB. In response to an instruction from the prediction mode control circuit 16, the prediction selection circuit 15 selects one of the input moving picture data F itself, forward predicted difference ΔP and bidirectionally predicted difference ΔB and sends the selected one to the intra-frame encoding circuit 17. The intra-frame encoding circuit 17 encodes the selected data by a compression method utilizing intra-frame correlation such as DCT to generate high-definition encoded data (MPEG-2) which is output from the high-definition encoded data output terminal T2.

In this embodiment, the control of the prediction mode for encoding (prediction mode) is intended to include both a frame type selection control for controlling which one of the I/P/B frames is to be selected as a frame to be encoded and a macro block mode selection control for controlling which one of intra/inter is to be selected for each macro block. Also in this embodiment, the process starting from the input terminal T1 to the prediction selection circuit 15 is called motion compensation.

The control of the encoding prediction mode is performed so that the pattern such as shown in the middle row of FIG. 3 is obtained. In FIG. 3, each rectangle represents one frame of a moving picture, and the abscissa represents time. A frame indicated by I is an I frame obtained by directly encoding an input moving picture. A frame indicated by P is a P frame obtained through encoding by forward prediction. A frame indicated by B is a B frame obtained through encoding by bidirectional prediction. A conceptual example of an encoding process by MPEG-2 and MPEG-4 will be described with reference to FIG. 3. In FIG. 3, the upper row shows frames of input pictures and affixes indicate a frame number. The middle row shows image data after the encoding process of MPEG-2 and affixes indicate a corresponding frame number. The lower row indicates image data after the encoding process of MPEG-4 and affixes indicate a corresponding frame number. It is assumed that the frames $F_0$ to $F_{11}$ input to the picture input terminal T1 are rearranged beforehand in the order of $F_2$, $F_0$, $F_1$, $F_5$, $F_3$, $F_4$, $F_8$, $F_6$, $F_7$, $F_{11}$, $F_9$ and $F_{10}$ in the frame number order shown in the middle row.

(1) A frame $I_2$ is encoded by using only the frame $F_2$.

(2) A frame $B_0$ is encoded by using the frame $F_0$ and a reference frame (hereinafter the reference frame is indicated by a broken line) $Fr_2$ decoded from the $I_2$ frame.

(3) A frame $B_1$, is encoded by using the frame $F_1$ and the reference frame $Fr_2$ decoded from the $I_2$ frame.

(4) A frame $P_5$ is encoded by using the frame $F_5$ and the reference frame $Fr_2$ decoded from the $I_2$ frame.

(5) A frame $B_3$ is encoded by using the frame $F_3$ and the reference frames $Fr_2$ and $Fr_5$ decoded from the $I_2$ $P_5$ frames.

(6) A frame $B_4$ is encoded by using the frame $F_4$ and the reference frames $Fr_2$ and $Fr_5$ decoded from the $I_2$ $P_5$ frames.

(7) A frame $P_8$ is encoded by using the frame $F_8$ and the reference frame $Fr_5$ decoded from the $P_5$ frame.

(8) A frame $B_6$ is encoded by using the frame $F_6$ and the reference frames $Fr_5$ and $Fr_8$ decoded from the $P_5$ $P_8$ frames.

(9) A frame $B_7$ is encoded by using the frame $F_7$ and the reference frames $Fr_5$ and $Fr_8$ decoded from the $P_5$ and $P_8$ frames.

(10) A frame $P_{11}$ is encoded by using the frame $F_{11}$ and the reference frame $Fr_8$ decoded from the $P_8$ frame.

(11) A frame $B_9$ is encoded by using the frame $F_9$ and the reference frames $Fr_8$ and $Fr_{11}$ decoded from the $P_8$ and $P_{11}$ frames.

(12) A frame $B_{10}$ is encoded by using the frame $F_{11}$ and the reference frames $Fr_8$ and $Fr_{11}$ decoded from the $P_8$ and $P_{11}$ frames.

Encoding is performed thereafter in a similar manner by forward and bidirectional predictions.

The local decoder circuit 18 decodes the I and P frames in the encoded data and stores it in the frame memory 12 as the reference frame Fr to be used for the next prediction.

Next, the operation of low-definition encoding will be described. In response to a control signal from the prediction control circuit 16, the frame extraction circuit 19 extracts data of the I and P frames from the high-definition encoded data under encoding and sends it to the transcoder circuit 20.

The transcoder circuit 20 converts the encoded data of the I and P frames into encoded data (MPEG-4) having a smaller image size and outputs it from the low-definition encoded data output terminal T3. In this case, the motion vector calculator 21 calculates the motion vector after conversion by using the motion vector for forward prediction obtained by the motion vector estimator 11.

With the above operations, since the same prediction mode is used for the high-definition encoding and low-definition encoding, it is not necessary to perform motion vector estimation for low-definition encoding. Since the computation amount can be reduced, both the high-definition and low-definition data can be generated at the same time with a small circuit scale and a small consumption power.

Next, the control of a macro block mode by the prediction selection circuit will be described with reference to FIG. 4 which is a detailed block diagram of the prediction selection circuit 15. The prediction selection circuit 15 has a frame mode selection circuit 151, an intra/interjudgement circuit 152 and a macro block mode selection circuit 153.

The frame mode selection circuit 151 selects one of the input data F, ΔP and ΔBm in accordance with which one of the frames I/P/B is selected. If the I frame is selected, the input data F is selected. If the P frame is selected, the forward prediction difference ΔP is selected.

If the B frame is selected, the intra/inter judgement circuit 152 judges whether it is more efficient to encode either the moving picture data F itself or the bidirectional prediction difference ΔB, both incoming at each micro block which is the encoding unit. In accordance with the judgement result, the macro block selection circuit 153 selects the moving picture data F or difference ΔB for each macro block and outputs difference data ΔBm selected for each macro block. This judgement for each macro block is not performed for the P frame.

The state of the intra (encoding of moving picture itself)/inter (encoding of prediction difference value) of a micro block before and after encoding of each frame will be described with reference to FIG. 5. In the example shown in FIG. 5, an image size is reduced by one/fourth both in the horizontal and vertical directions to perform encoding. Each block represents a macro block. In the I frame, blocks are all intra macro blocks constituting one I frame. In the P frame, blocks are all inter macro blocks constituting one P frame. In the B frame, blocks are made of mixed intra and inter macro blocks, which poses no problem because transcoding is not performed. Since the same mode is used for a plurality of macro blocks to be transcoded, it is not necessary to perform intra/inter conversion even if prediction is required to be performed again. The computation amount can therefore be reduced, and both the high-definition and low-definition data can be generated at the same time with a small circuit scale and a small consumption power.

If the macro block mode of the P frame is performed only by the inter scheme, an encoding efficiency and an image quality may be lowered when an abrupt picture change such as a scene change occurs.

Figure 6:
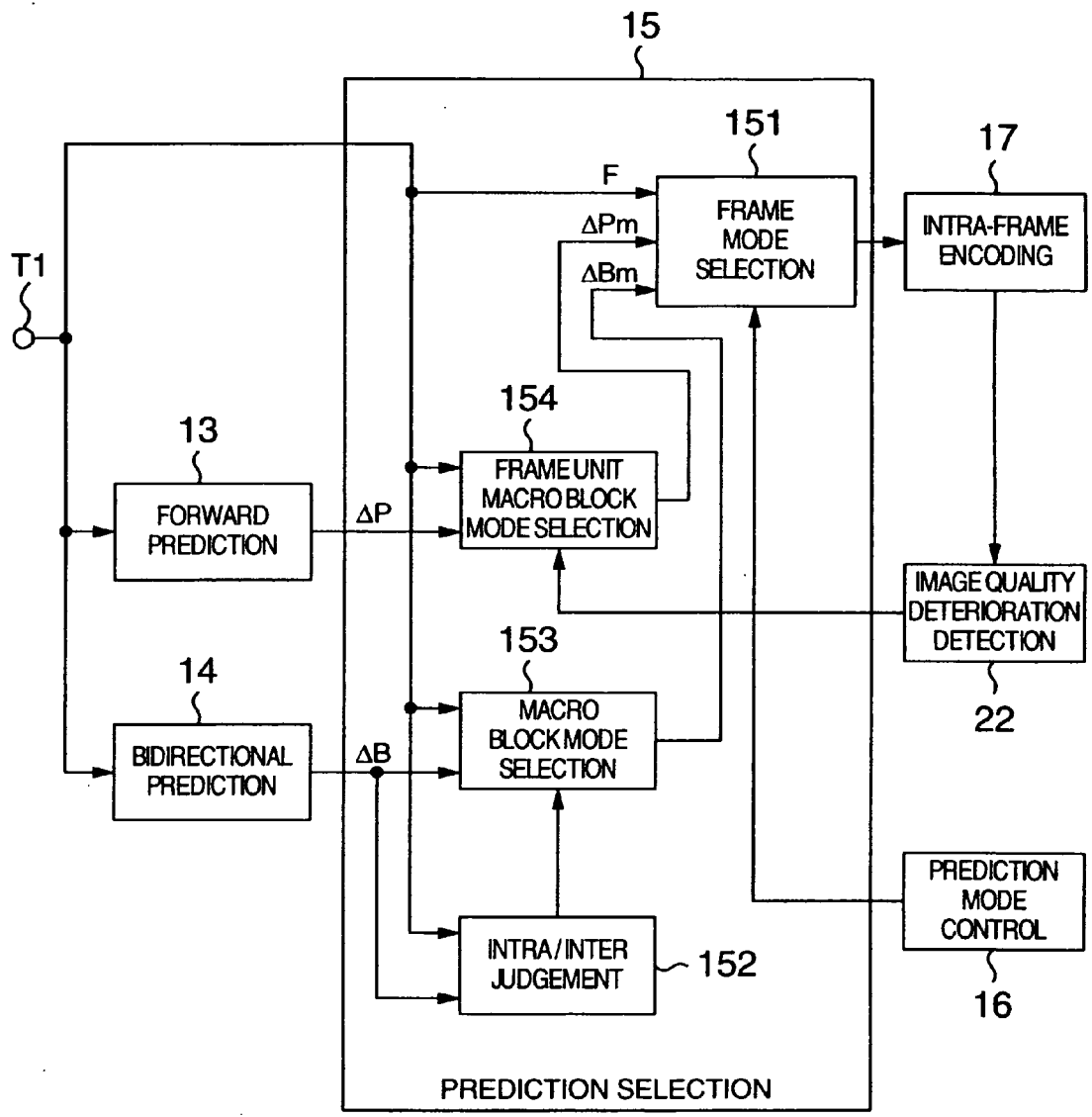
FIG. 6 is a detailed block diagram of a prediction selection circuit portion of a moving picture encoding apparatus according to a second embodiment of the invention.

Next, the embodiment dealing with such a case will be described with reference to the block diagram of FIG. 6. The circuit portions not shown in FIG. 6 are the same as those of the embodiment shown in FIG. 2. In this embodiment shown in FIG. 6, an image quality deterioration detector circuit 22 is added for monitoring an output of the intra-frame encoding circuit 17 and detecting an image quality deterioration, and the prediction selection circuit 15 is constituted of a frame mode selection circuit 151, an intra/inter judgement circuit 152, a micro block mode selection circuit 153 and a frame unit macro block mode selection circuit 154.

The image quality deterioration detection circuit 22 receives information representative of quantization coarseness or the like having a high correlation with the image quality from the intra-frame encoding circuit 17, monitors this information to detect an image quality deterioration of a P frame to be caused by a scene change or the like, and issues a command at the next P frame to the frame unit macro block mode selection circuit 154.

The frame unit macro block mode selection circuit 154 selects, during the next frame which received the command, the input moving picture data F itself (intra micro blocks) in place of the forward prediction difference data ΔP. Therefore, even if the image quality is deteriorated by the scene change, the efficiency is improved in the next P frame with intra macro blocks so that the image quality can be recovered.

FIG. 7 shows the state of selecting intra/inter macro blocks for the P frame before and after transcoding according to the embodiment. For the P frame immediately after the image quality deterioration, the frame unit macro block mode selection circuit 154 selects not the inter macro blocks corresponding to the difference ΔP supplied from the forward prediction circuit 13 but the intra macro blocks of the input picture data F and performs transcoding of the intra macro blocks. For other P frames, the circuit 154 selects the inter macro blocks corresponding to the difference ΔP and performs transcoding of the inter macro blocks. Also in this embodiment, since the same mode is used for a plurality of macro blocks to be transcoded, it is not necessary to perform intra/inter conversion even if prediction is required to be performed again. The computation amount can therefore be reduced, and both the high-definition and low-definition data can be generated at the same time with a small circuit scale and a small consumption power.

Figure 8:
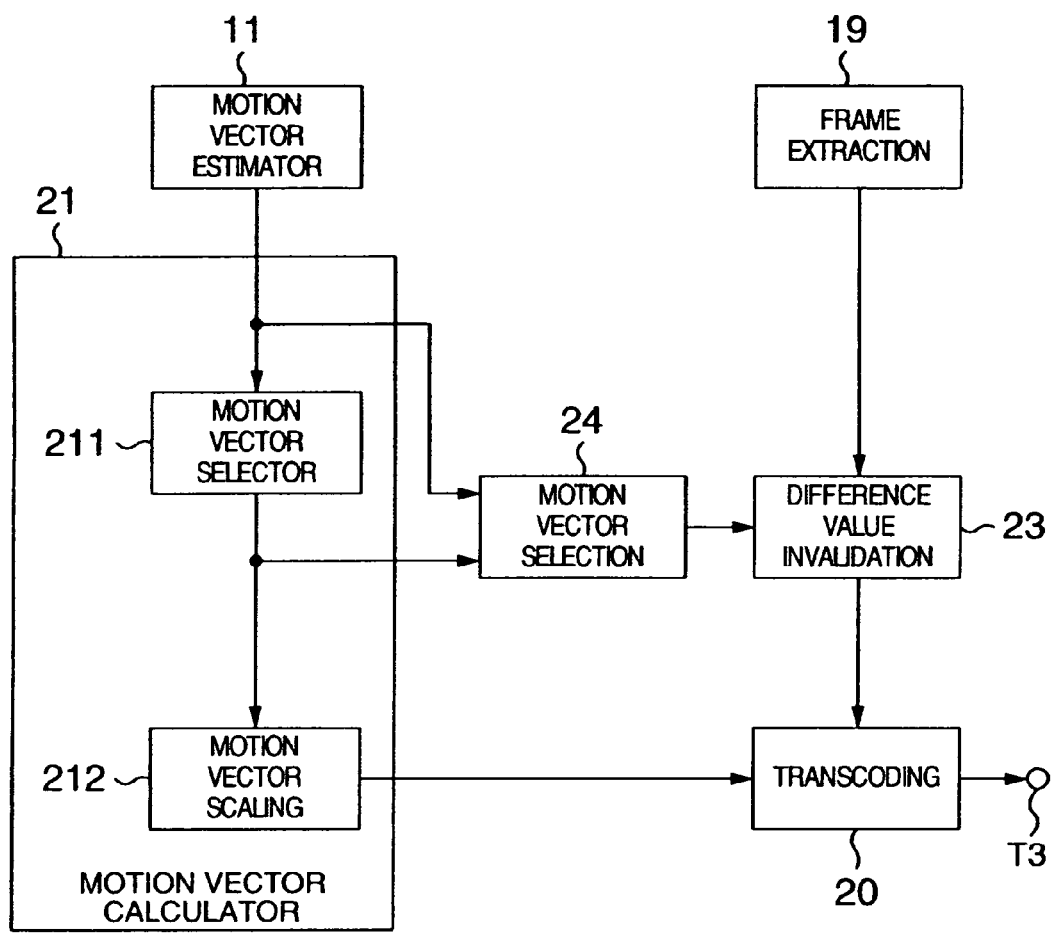
FIG. 8 is a detailed block diagram of a transcoding circuit portion of a moving picture encoding apparatus according to a third embodiment of the invention.

Next, another embodiment will be described with reference to FIG. 8, in which the motion vector estimator 11 and transcoder circuit 20 further reduce the computation amount. FIG. 8 is a block diagram showing the outline of a low-definition encoding process section of the embodiment. The circuit portions not shown in FIG. 8 are similar to those of the embodiment shown in FIG. 2. In the embodiment shown in FIG. 8, a difference value invalidating circuit 23 and a motion vector comparison circuit 24 are additionally used and the motion vector calculator 21 is constituted of a motion vector selector 211 and a motion vector scaling circuit 142. In the motion vector calculator 21, the motion vector selector 211 selects an optimum motion vector from a plurality of motion vectors sent from the motion vector estimator 11, and the motion vector scaling circuit 212 converts the scale of the selected optimum motion vector so as to make it match the image size after transcoding.

The motion vector comparison circuit 24 compares the selected motion vector with a plurality of motion vectors, and if there is a large difference, issues a command to the difference value invalidating circuit 23. Upon reception of this command, the difference value invalidating circuit 23 replaces the difference value components corresponding to the motion vector with a value of 0. This replacement state is illustrated in FIG. 9. The motion vector selector 211 monitors motion vectors in blocks of a frame and selects the motion vector which is largest in number in the frame. The motion vector scaling circuit 212 changes the scale of the motion vector by using the selected motion vector. If the motion vector supplied from the motion vector estimator 11 is different from the motion vector selected by the motion vector selector 211, the vector comparison circuit 24 issues a command to the difference value invalidating circuit 23 whereat the difference value is replaced with 0. This image is reduced in size by the transcoder circuit 20 so that the image replaced with 0 after transcoding is filled with the reference image data subjected to motion compensation by the same motion vector as nearby motion vectors.

Therefore, although there is some deviation from an original image, thee is no image quality deterioration such as large noises to be caused by different difference data. It is therefore unnecessary to perform again motion compensation prediction also for the image portion with different motion vectors. The computation amount can therefore be reduced, and both the high-definition and low-definition data can be generated at the same time with a small circuit scale and a small consumption power.

With reference to the block diagram shown in FIG. 10, the outline structure and operation of a moving picture recording/reproducing apparatus according to a second embodiment of the invention will be described. This moving picture recording/reproducing apparatus can record an input moving picture as high-definition encoded data (MPEG-2) and reproduce both a MPEG-2 image and low-definition encoded data (MPEG-4). The structure and operation of a recording apparatus constituted of the circuit portion from the motion vector estimator 11 to the local decoder circuit 18 are the same as those of the embodiment shown in FIG. 2, and so the description thereof is omitted. High-definition encoded data is recorded via a recorder 100 into a storage medium not shown.

The reproducing apparatus is constituted of a reproducing circuit 101, a frame memory 52, a forward prediction circuit 53, a bidirectional prediction circuit 54, a prediction selection circuit 55, a prediction mode detection circuit 56, an intra-frame decoding circuit 57, a frame extraction circuit 19, a transcoder circuit 20, a motion vector calculator 21, a low-definition encoded data output terminal T3, and a moving picture data output terminal T4.

The reproducing circuit 101 reproduces high-definition encoded data (MPEG-2) from the storage medium not shown.

The frame memory 52 stores data (I/P/B frame) selected by the prediction selection circuit 55 as a next reference frame Fr.

The forward prediction circuit 53 performs forward prediction through motion compensation by the reference frame Fr in accordance with the motion vector contained in the data decoded by the intra-frame decoding circuit 57, and adds the difference value ΔP to recover the original data (P frame).

The bidirectional prediction circuit 54 performs bidirectional prediction through motion compensation by the reference frame Fr in accordance with the motion vector contained in the data decoded by the intra-frame decoding circuit 57, and adds the difference value ΔB to recover the original data (B frame).

The prediction selection circuit 55 selects one of the decoded moving picture data (I frame) itself, data (P frame) recovered by forward prediction and data (B frame) recovered by bidirectional prediction, in accordance with I/P/B information.

The prediction mode detection circuit 56 detects I/P/B information in accordance with prediction mode information decoded by the intra-frame decoding circuit 57.

The intra-frame decoding circuit 57 decodes high-definition encoded data reproduced by the reproducing circuit 101 to generate the moving picture data (I frame) itself, prediction difference value ΔP or ΔB. The intra-frame decoding circuit 57 also decodes I/P/B prediction mode information and a motion vector value.

Figure 11:
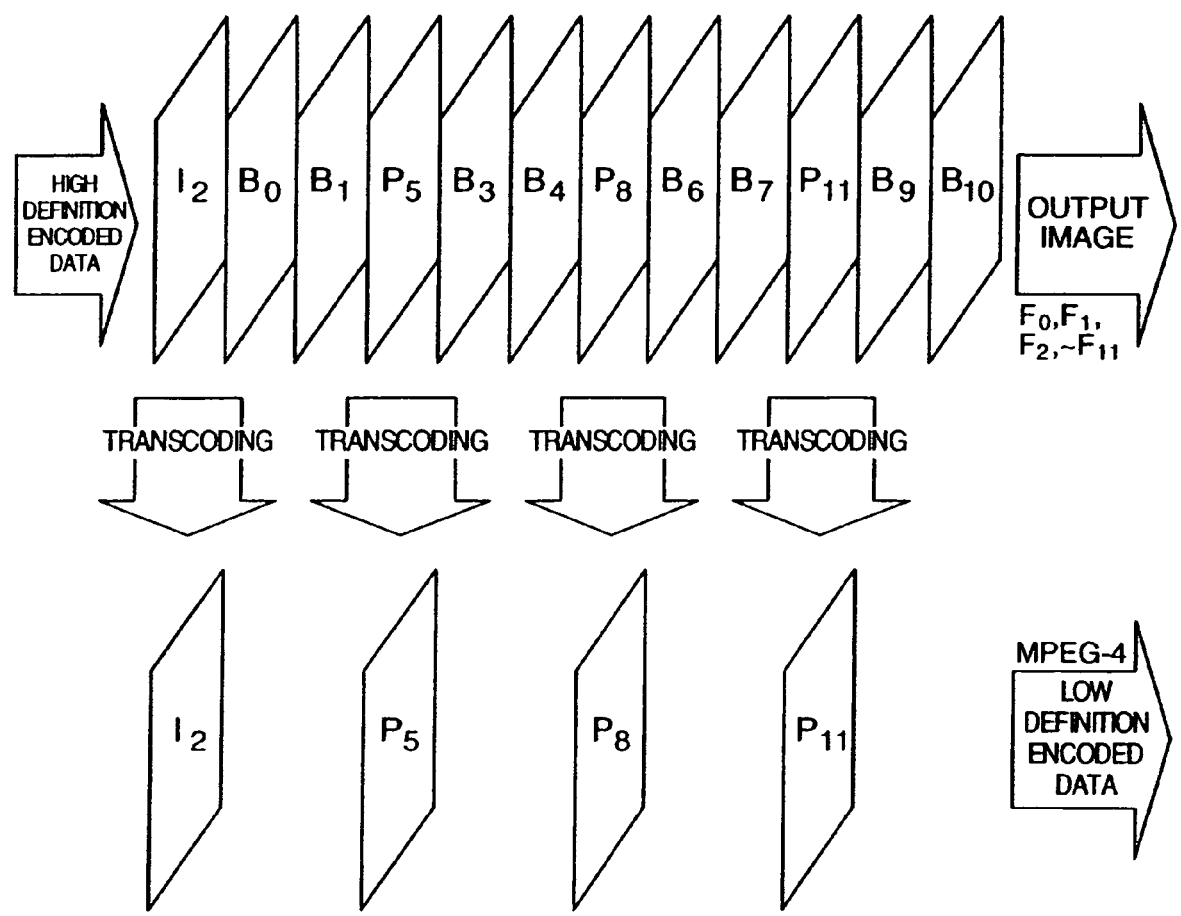
FIG. 11 is a conceptual diagram showing encoded data having a different frame rate and a different image size to be converted by the moving picture recording/reproducing apparatus of the embodiment.

The frame extraction circuit 19 extracts I or P frame data from high-definition encoded data under decoding as shown in the lower row in FIG. 11, in response to a control signal from the prediction mode detection circuit 56.

The transcoder circuit 20 converts I and P frame encoded data into low-definition encoded data (MPEG-4) having a smaller image size.

The motion vector calculator 21 calculates motion vector after conversion by using a forward prediction motion vector.

The low-definition encoded data output terminal T3 is used for outputting low-definition encoded data (MPEG-4).

The moving picture data output terminal T4 is used for outputting data (I/P/B frame) selected by the prediction selection circuit 55.

Next, the reproduction operation will be described. The intra-frame decoding circuit 57 decodes the high-definition encoded data (MPEG-2) reproduced from the storage medium by the reproducing circuit 101 to generate the moving picture data (I frame) itself, prediction difference value ΔP or ΔB. The intra-frame decoding circuit 57 also decodes the I/P/B prediction mode information and a motion vector value.

The forward prediction circuit 53 performs forward prediction through motion compensation by the reference frame Fr in accordance with the motion vector, and adds the difference value ΔP to recover the original data (P frame). The bidirectional prediction circuit 54 performs bidirectional prediction through motion compensation by the reference frame Fr in accordance with the motion vector, and adds the difference value ΔB to recover the original data (B frame).

The prediction selection circuit 55 selects one of the decoded moving picture data (I frame) itself, the data (P frame) recovered by forward prediction and the data (B frame) recovered by bidirectional prediction, in accordance with the I/P/B information detected by the prediction mode detection circuit 56. The selected data is output from the moving picture data output terminal T4, and stored in the frame memory 52 as the next reference frame.

Next, conversion into low-definition encoded data will be described with reference to FIG. 11. FIG. 11 is a conceptual diagram showing encoded data having a different frame rate and a different image size to be converted by the moving picture recording/reproducing apparatus of the embodiment. In response to a control signal from the prediction mode detection circuit 56, the frame extraction circuit 19 extracts data of the I and P frames from the high-definition encoded data under decoding and sends it to the transcoder circuit 20. The transcoder circuit 20 converts the encoded data of the I and P frames into encoded data (MPEG-4) having a smaller image size by using motion vector after conversion supplied from the motion vector calculator 21, and outputs it from the low-definition encoded data output terminal T3. In this case, the motion vector calculator 21 calculates the motion vector after conversion by using the motion vector for forward prediction.

With the above operations, since the same prediction mode is used for the high-definition encoding and low-definition encoding, it is not necessary to perform vector estimation for low-definition encoding. Since the computation amount can be reduced, the low-definition data can be converted from the high-definition data, with a small circuit scale and a small consumption power.

Figure 12:
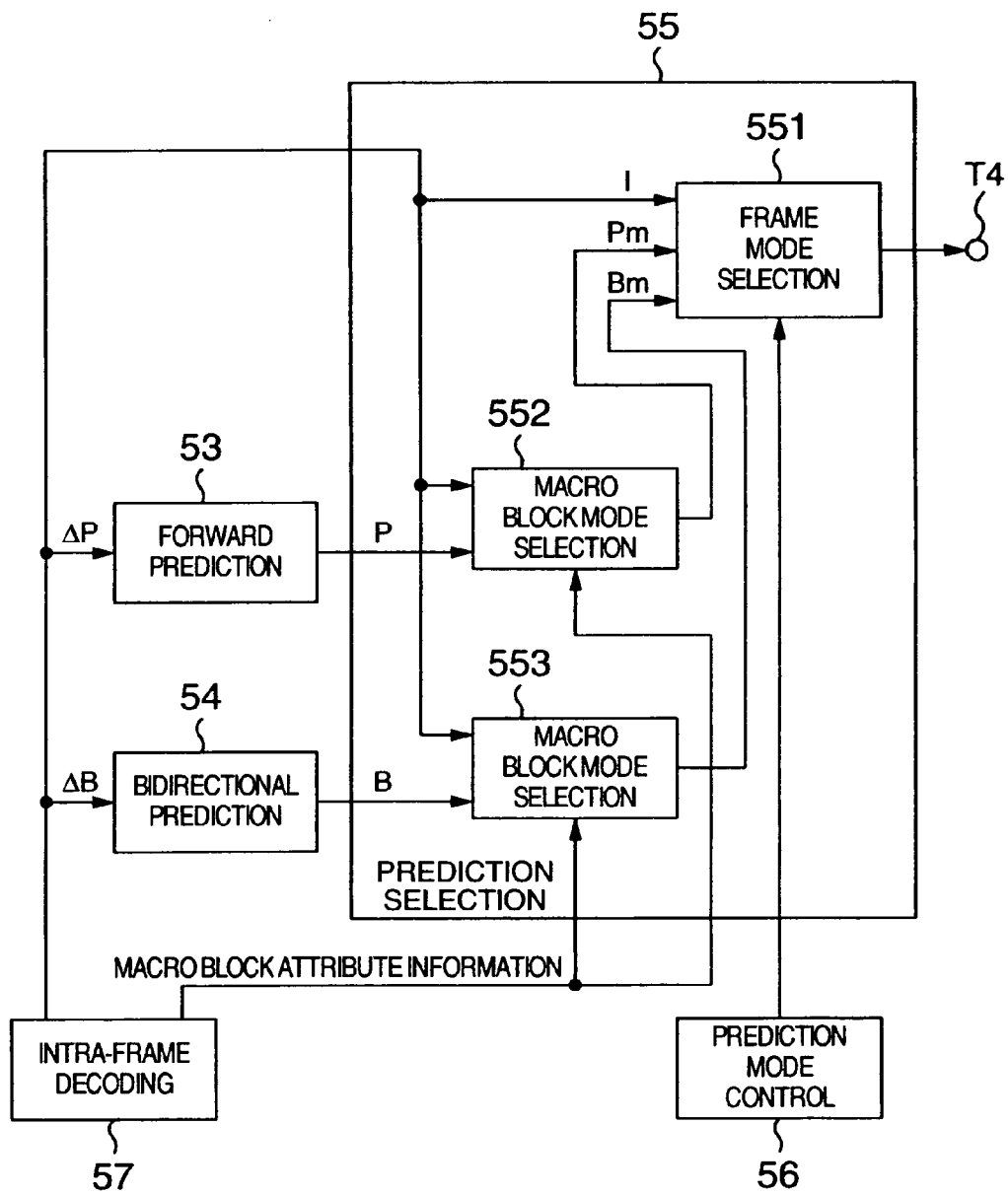
FIG. 12 is a detailed block diagram showing a prediction selection circuit of the moving picture recording/reproducing apparatus of the embodiment.

Next, the control of a macro block mode during the reproduction will be described with reference to FIG. 12 showing the detailed block diagram of the prediction selection circuit 55 of the reproducing apparatus shown in FIG. 10. The prediction selection circuit 55 has a frame mode selection circuit 551, a macro block mode selection circuit 552 and a macro block mode selection circuit 553.

The frame mode selection circuit 551 selects data in accordance with I/P/B information.

The macro block mode selection circuits 552 and 553 select the I frame information, forward prediction data ΔP or bidirectional prediction data ΔB decoded by the intra-frame decoding circuit 57, in accordance with intra/inter information which is attribute information of each macro block. Data output from the macro block mode selection circuit 552 is represented by Pm, and data output from the macro mode selection circuit 553 is represented by Bm.

The frame mode selection circuit 551 selects data in accordance with I/P/B information. The intra-frame decoding circuit 57 decodes the intra/inter information of each macro block, and in accordance with the decoded information, the macro block mode selection circuits 552 and 553 select data.

Figure 4:
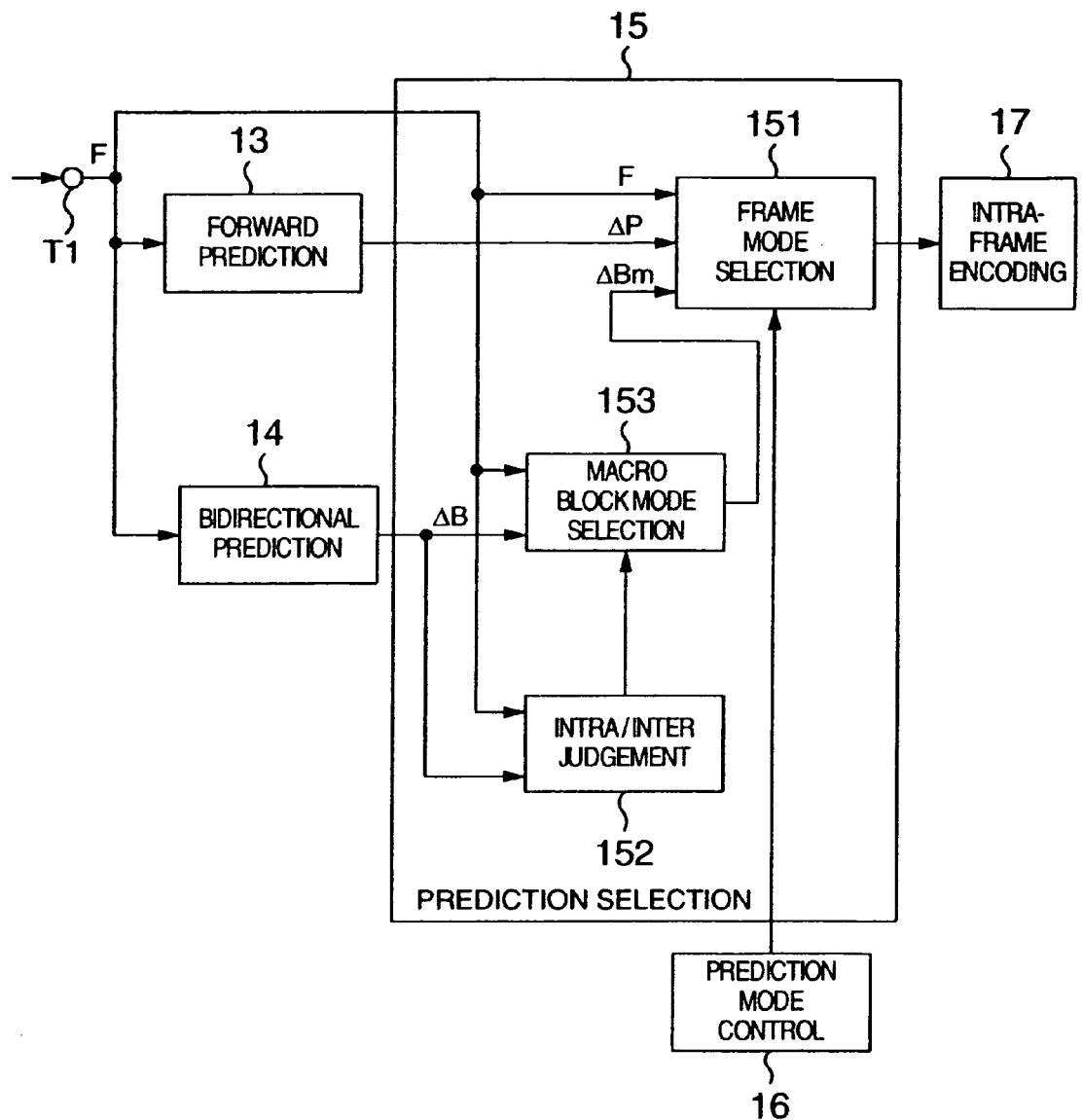
FIG. 4 is a detailed block diagram showing a prediction selection unit of the moving picture encoding apparatus according to the invention.

The detailed block diagram of the prediction selection circuit 15 of the recording apparatus is the same as that shown in FIG. 4. The state of intra/inter of decoded macro blocks is similar to that shown in FIG. 5. Since the same mode is used for a plurality of macro blocks to be transcoded, it is not necessary to perform intra/inter conversion even if prediction is required to be performed again. The computation amount can therefore be reduced, and the low-definition encoded data can be converted from the high-definition data, with a small circuit scale and a small consumption power.

Figure 10:
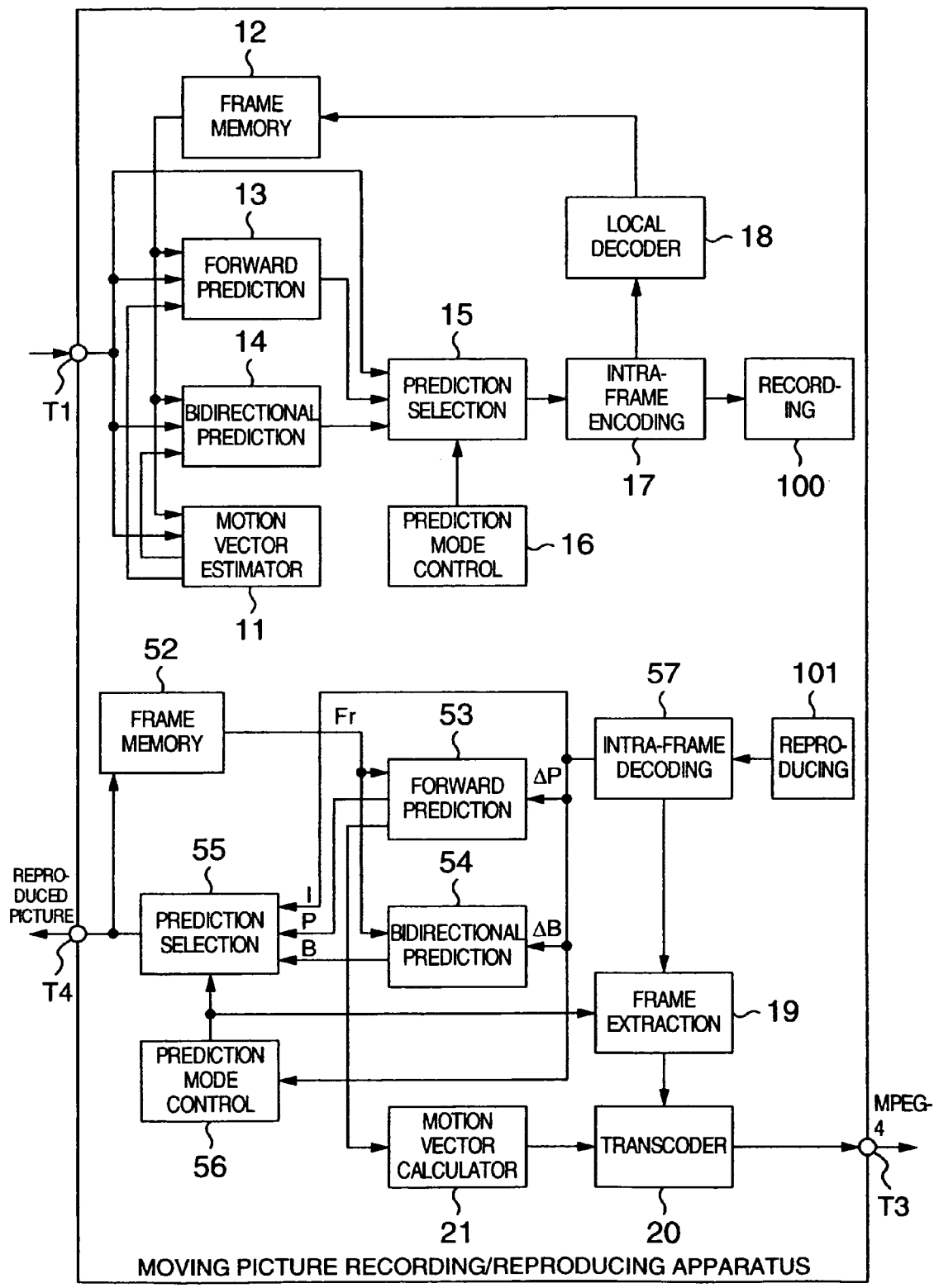
FIG. 10 is a block diagram showing a moving picture recording/reproducing apparatus according to an embodiment of the invention.

In FIG. 10, the prediction selection circuit 15 of the recording apparatus may be changed to the prediction selection circuit 15 shown in the block diagram of FIG. 6. In this case, similar to the encoding apparatus, even if the image quality is deteriorated by a scene change, the efficiency is improved at the next P frame by intra so that the image quality is recovered. The state of selection of intra/inter for macro blocks in the P frame is similar to that shown in FIG. 7. Also in this embodiment, since the same mode is used for a plurality of macro blocks to be transcoded, it is not necessary to perform intra/inter conversion even if prediction is required to be performed again. The computation amount can therefore be reduced, and the low-definition encoded data can be converted from the high-definition data, with a small circuit scale and a small consumption power.

Figure 13:
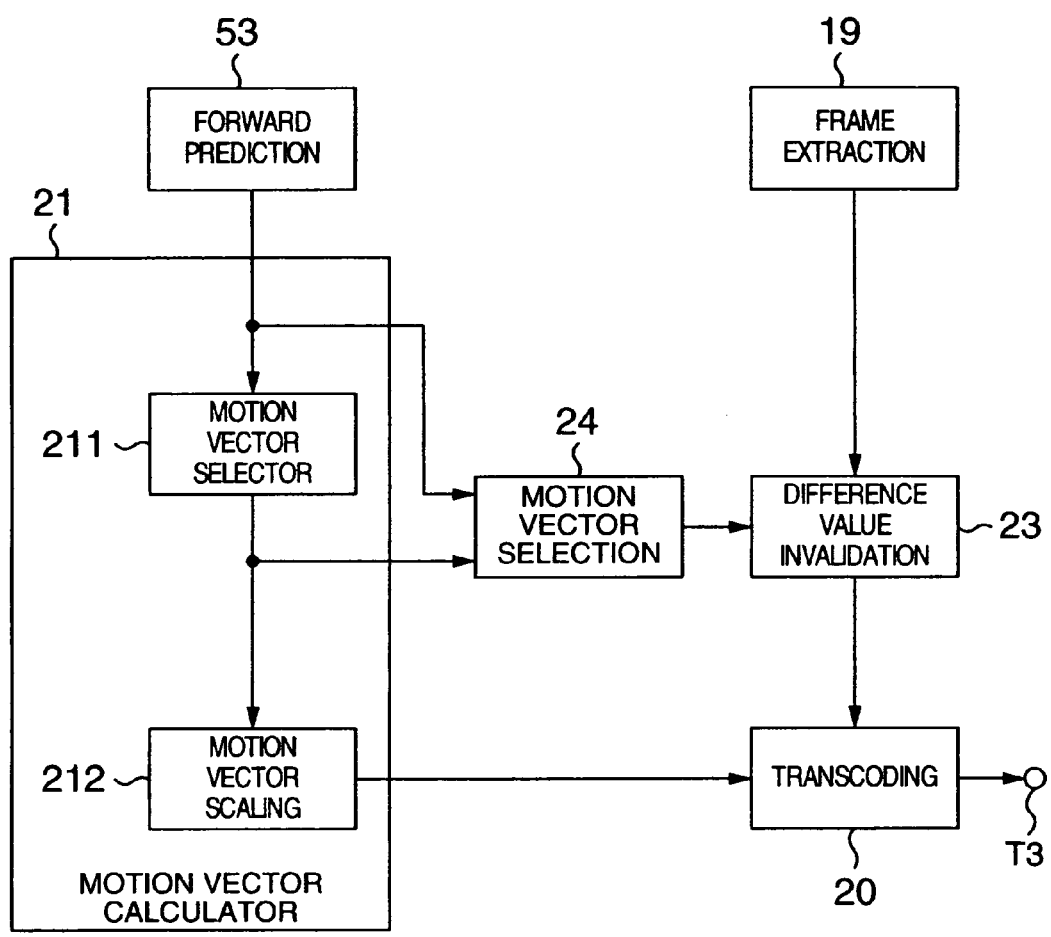
FIG. 13 is a detailed block diagram showing a transcoder circuit of a moving picture recording/reproducing apparatus according to another embodiment of the invention.

Next, another embodiment will be described with reference to FIG. 13, in which the motion vector estimator 11 and transcoder circuit 20 further reduce the computation amount. The circuit portions not shown in FIG. 13 are similar to those of the embodiment shown in FIG. 10. Similar to the encoding apparatus, a difference value invalidating circuit 23 and a motion vector comparison circuit 24 are additionally used. In the motion vector calculator 21, the motion vector selector 211 selects an optimum motion vector from a plurality of motion vectors sent from the forward prediction circuit 53, and the motion vector scaling circuit 212 converts the scale of the selected optimum motion vector so as to make it match the image size after transcoding.

The motion vector comparison circuit 24 compares the selected motion vector with a plurality of motion vectors, and if there is a large difference, issues a command to the difference value invalidating circuit 23. Upon reception of this command, the difference value invalidating circuit 23 replaces the difference value components corresponding to the motion vector with a value of 0. This replacement state is illustrated in FIG. 9.

The image replaced with 0 after transcoding is filled with the reference image data subjected to motion compensation by the same motion vector as nearby motion vectors. Therefore, although there is some deviation from an original image, there is no image quality deterioration such as large noises to be caused by different difference data. It is therefore unnecessary to perform again motion compensation prediction also for the image portion with different motion vectors. The computation amount can therefore be reduced, and both the high-definition and low-definition data can be generated at the same time with a small circuit scale and a small consumption power.

As described so far in each embodiment, in encoding of MPEG-4, the motion vector estimation is not performed. A half of the consumption power is occupied by the motion vector estimation. According to each embodiment of the invention, the power consumption of MPEG-4 can be halved. For example, in dual encoding of MPEG-2 and MPEG-4, the consumption power of MPEG-4 is about one fifth of the total power consumption. Since the consumption power of MPEG-4 is halved, the total consumption power can be reduced by about one tenth.

According to the invention, it is possible to generate both high and low-definition encoded data at the same time with a small circuit scale and with a small power consumption and to convert high-definition encoded data into low-definition encoded data.

While we have shown and described several embodiments in accordance with our invention, it should by understood that disclosed embodiments are susceptible of changes and modifications without departing from the scope of the invention. Therefore, we do not intend to be bound by the details shown and described herein but intend to cover all such changes and modifications within the ambit of the appended claims.

What is claimed is:

1. A moving picture recording/reproducing apparatus for recording encoded data of a moving picture obtained through motion-compensated inter-frame prediction in a storage medium and reproducing the encoded and recorded data from the storage medium and decoding the encoded data, comprising:

a first encoding module for encoding an input moving picture at a first frame rate and at a first image size;

a decoding module for decoding data encoded by said first encoding module;

a re-encoding module for re-encoding a predetermined frame extracted from frames decoded by said decoding module, at a second frame rate smaller than the first frame rate and at a second image size smaller than the first image size;

motion vector calculation module for calculating a motion vector to be used for prediction by said re-encoding module from a motion vector decoded by said decoding module; and prediction mode control module for controlling a prediction mode of said first encoding module to make the prediction mode of said first encoding module be coincident with a prediction mode of said re-encoding module, so that said motion vector calculated by said motion vector calculation module can be used by said re-encoding module.

2. A moving picture recording/reproducing method of recording encoded data of a moving picture obtained through motion-compensated inter-frame prediction in a storage medium and reproducing the encoded and recorded data from the storage medium and decoding the encoded data, comprising:

a first encoding step of encoding an input moving picture at a first frame rate and at a first image size;

a decoding step of decoding data encoded by said first encoding step;

a re-encoding module of re-encoding a predetermined frame extracted from frames decoded by said decoding step, at a second frame rate smaller than the first frame rate and at a second image size smaller than the first image size;

a motion vector calculation step of calculation a motion vector to be used for prediction by said re-encoding step from a motion vector decoded by said decoding step; and a prediction mode control step of controlling a prediction mode of said first encoding step to make the prediction mode of said first encoding step be coincident with a prediction mode of said re-encoding step, so that said motion vector calculated by said motion vector calculation step can be used by said re-encoding step.

* * * * *